Feb. 3, 1925.  
O. ABBADINI  
DEMOUNTABLE RIM  
Filed Dec. 12, 1922  
1,525,351  
2 Sheets-Sheet 1

Inventor  
O. Abbadini.  
By  
Attorney

Feb. 3, 1925.
O. ABBADINI
1,525,351
DEMOUNTABLE RIM
Filed Dec. 12, 1922    2 Sheets-Sheet 2
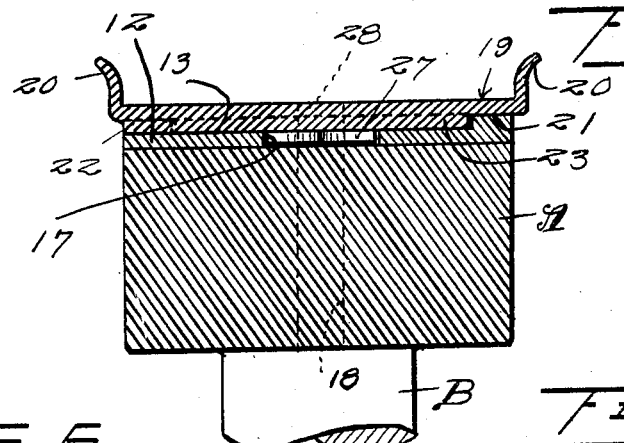
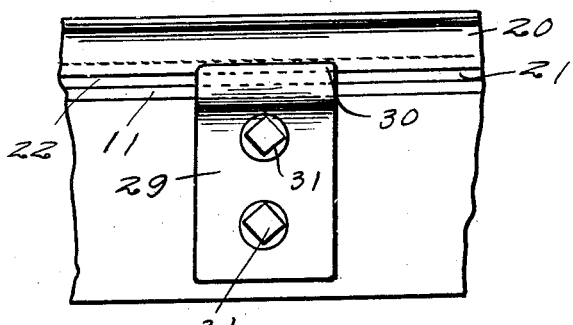
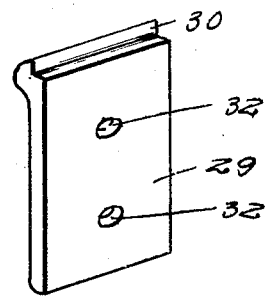
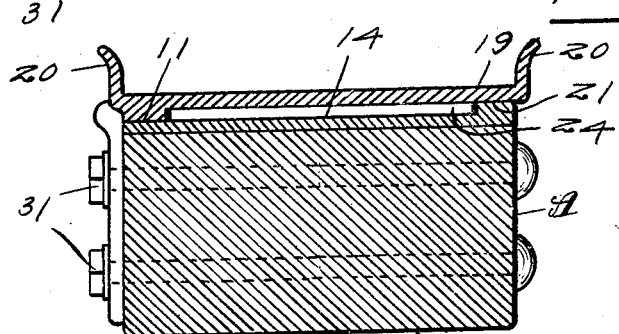
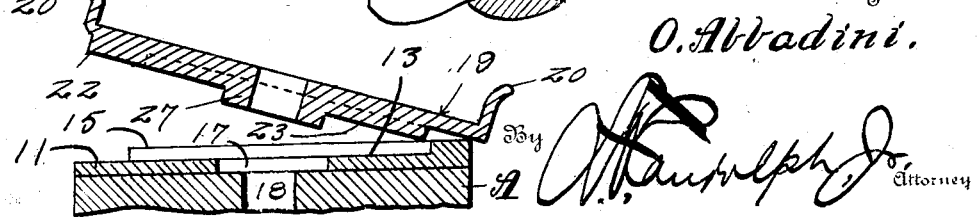
Inventor
O. Abbadini.
By
Attorney Patented Feb. 3, 1925.

1,525,351

UNITED STATES PATENT OFFICE.

ORGERIO ABBADINI, OF FAIRBANKS, PENNSYLVANIA.

DEMOUNTABLE RIM.

Application filed December 12, 1922. Serial No. 606,439.

*To all whom it may concern:*

Be it known that I, ORGERIO ABBADINI, a citizen of the United States, residing at Fairbanks, in the county of Fayette and State of Pennsylvania, have invented certain new and useful Improvements in Demountable Rims; and I do hereby declare the following to be a full, clear, and exact description of the invention, such as will enable others skilled in the art to which it appertains to make and use the same.

This invention relates to a demountable rim construction for vehicle wheels of the type equipped with pneumatic and resilient tires.

It is generally aimed to simplify the means of connection of such a rim to the wheel felly so that the application and removal of the same will be easier and may be more readily accomplished, in which the manufacturing cost will also be reduced and in connection with the handling of which the employment of special or expensive tools is avoided.

Another object is to provide a construction involving an interlocking stud and slot at the rim and felly, through which stud the tire valve passes, the stud and recess being adapted to interfit through initial angular disposition of the rim with respect to the felly in the act of applying the rim to the felly.

Another object is to provide in such a construction, a single lug which may complete the fastening of the rim on the felly.

Still another object is to provide a construction in which interfitting preferably wedge shaped projections between the rim and felly are used.

Various additional objects and advantages will become apparent from a consideration of the description following taken in connection with accompanying drawings illustrating an operative embodiment thereof.

In said drawings:—

Figure 5 is a cross sectional view on the line 5—5 of Figure 3;

Figure 6 is a fragmentary side elevation illustrating the rim-securing lug fastened to the wheel;

Figure 7 is a cross sectional view of the part of the wheel shown in Figure 6;

Figure 8 is a detail perspective view of the rim-securing lug, and

Figure 9 is a fragmentary perspective view illustrating the initial position of the rim during the process of fastening it to the felly.

Like reference characters designate like or similar parts in the different views.

Figure 1:
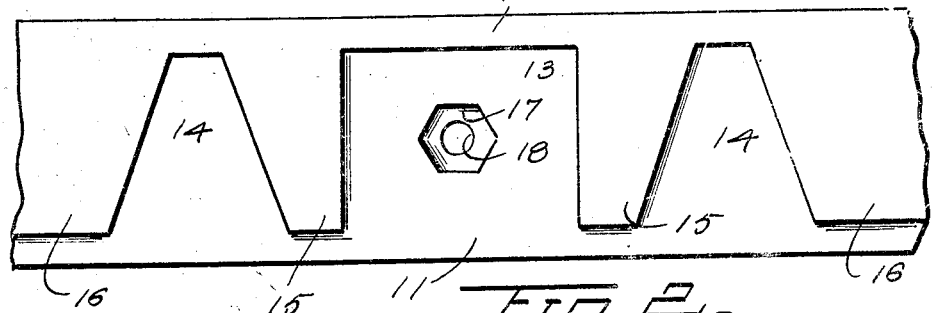
Figure 1 is a fragmentary plan view of the felly band employed.
Figure 2:
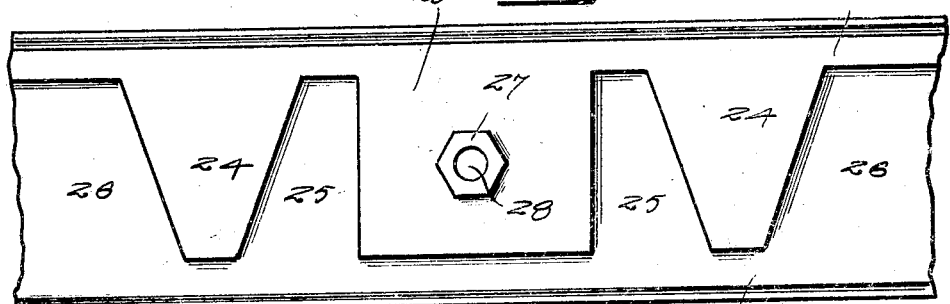
Figure 2 is an inverted plan view of a fragment of the rim.
Figure 3:
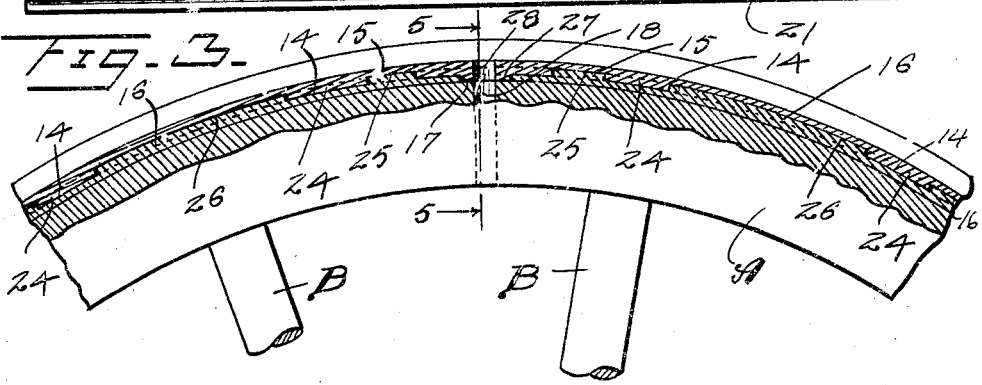
Figure 3 is a fragmentary view partly in side elevation and partly in section showing the improvements applied to a wheel.
Figure 4:
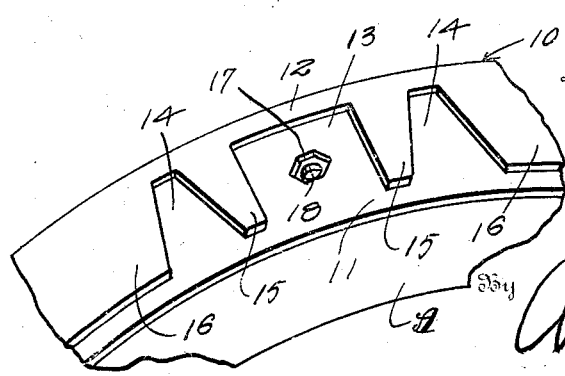
Figure 4 is a fragmentary plan view of the felly and band applied thereto.

Referring specifically to the drawings, a conventional wheel felly is shown at A having usual spokes B radiating from the hub (not shown) and connected thereto. The felly is usually of wood and has swaged or otherwise peripherally rigidly fastened thereto, a metallic band generally designated 10. Said band 10 is reduced in thickness inwardly from its outer surface and one side in order to provide a reduced flange 11 annularly around the same at one side, an unbroken heel portion 12 annularly about the band at the opposite side to said flange, a substantially rectangular recess or depression 13, wedge shaped recesses 14 and substantially wedge shaped projections 15 and 16 terminating at their free edges short of the flange 11.

Provided completely through the band 10 is a slot 17 which may be hexagonal as shown or of any other desired shape. Said slot registers with a radial passageway 18 through the felly A through which the usual valve of a pneumatic tire removably passes.

A tire-supporting rim is shown at 19 and generally may be of any conventional shape. In the present instance it has outwardly extending retaining flanges at 20 in order to provide a channel to removably mount or seat a pneumatic tire. The inner surface of the rim 19 is shaped reversely to that of the outer surface of the band 10. To this end, rim 19 is reduced in thickness so as to provide a relatively thin flange at 21 which extends annularly about the band, a relatively thick unbroken edge portion or heel 22 annularly about the band, a rectangular projection 23 to fit the recess 13, wedge shape projections 24 to fit the recesses 14, and recesses 25 and 26 to receive the projections 15 and 16, respectively. Flange 21 is adapted to overlap the relatively thick edge or heel portion 12 while the flange 15 is adapted to overlap the relatively thick or heel portion 22.

Depending or extending inwardly from the rim 19 is a stud or projection 27 preferably hexagonal or otherwise shaped so as to fit the slot 17. Through the rim 19 at said stud 27, an opening 28 is provided which registers with the opening or passageway 18 and through both of which the valve of a pneumatic tire passes. It will be noted that the stud 27 is of slight depth or thickness and is also relatively small to the end that its entrance into and removal from the slot 17 is permissible.

As particularly shown in Figure 9, in the act of applying the rim with the tire thereon, to the felly, the rim is initially angularly disposed with the stud 27 located in the slot 17. Thereafter pressure against the rim and in a direction toward the wheel, particularly at a point on the rim diametrically opposite to the stud 27, will cause the rim to move into place on the felly with the projection 23 received in the recess 13, the projections 15 and 16 received in the recesses 25 and 26 respectively and the projections 24 received in the recesses 14, with heel 12 overlapped by flange 21 and heel 22 overlapped by flange 11.

With the construction described, a single rim-retaining lug is sufficient. Such a lug is particularly shown in Figures 6, 7 and 8. It is generally designated 29, has a lip 30 which overlaps the rim 19 at one side and is removably secured in place by bolts or the like 31 passed through openings 32 in the lug and mounted by the felly A as particularly shown in Figures 6 and 7. The lug 29 is preferably secured to the felly A at a point diametrically opposite to the stud 27. It will be realized that any other form of fastening means may be substituted in place of the lug 29, if desired.

The band 10 and rim 19 are each preferably made in a single piece of metal and preferably endless and devoid of a split or line of separation.

The various interfitting recesses and projections may extend completely about the rim and felly band or only at suitable intervals as preferred.

Various changes may be resorted to provided they fall within the spirit and scope of the invention.

I claim as my invention:—

1. In combination, a rim, a felly band, interengaging wedge-shaped projections and recesses on said rim and felly band to prevent relative turning movement thereof, said rim having a circumferential flange and a circumferential heel at opposite longitudinal edges, and said felly band having a heel and flange overlapped by said flange and heel.

2. In combination, a rim, a felly band, interengaging wedge-shaped projections and recesses on said rim and felly band to prevent relative turning movement thereof, said rim having a circumferential flange and a circumferential heel at opposite longitudinal edges, said felly having a circumferential heel and circumferential flange overlapped by said flange and heel, a rectangular stud extending from one of the projections of the rim, and the felly band having a rectangular recess to receive said stud.

3. In combination, a rim, a felly band, interengaging wedge-shaped projections and recesses on said rim and felly band to prevent relative turning movement thereof, said rim having a circumferential flange and a circumferential heel at opposite longitudinal edges, said felly having a circumferential heel and circumferential flange overlapped by said flange and heel, a rectangular stud extending from one of the projections of the rim, the felly band having a rectangular recess to receive said stud, through angular movement of the rim relatively to the felly band, and said stud having a valve-accommodating opening therethrough.

4. In combination, a rim member, a felly member, said rim member and band having alternate interengaging wedge-shaped projections and recesses, both said rim and felly band having a circumferential heel at one side edge, the projections terminating short of the opposite side edges of the rim and felly band to provide flanges to overlap said heels.

5. In combination, a rim, a felly band, said rim and band having alternate interlocking recesses and wedge-shaped projections, opposite side edges of said rim and band constituting circumferential heels, the projections terminating short of the other side edges of said rim and band to provide circumferential flanges to overlap said heels, a stud extending inwardly from one of the projections of the rim, the band having a slot to receive said stud through angular movement of the rim relatively to the band, said stud having a valve-accommodating opening therethrough, said rim and said band each being in a single piece, and means to secure said rim and felly together supplementing the engagement of said stud and slot.

In testimony whereof I affix my signature in presence of a witness.

ORGERIO ABBADINI.

Witness:
BENNETT S. JONES.